(12) United States Patent
Oberg

(10) Patent No.: US 7,218,805 B2
(45) Date of Patent: May 15, 2007

(54) WDM RING NETWORK FOR FLEXIBLE CONNECTIONS

(75) Inventor: Magnus Oberg, Hagersten (SE)

(73) Assignee: Transmode Holding AB, Hagersten (SE)

(*) Notice: Subject to any disclaimer, the term of this patent is extended or adjusted under 35 U.S.C. 154(b) by 88 days.

(21) Appl. No.: 10/483,390

(22) PCT Filed: Jul. 12, 2002

(86) PCT No.: PCT/SE02/01381

§ 371 (c)(1),
(2), (4) Date: Mar. 24, 2004

(87) PCT Pub. No.: WO03/007521

PCT Pub. Date: Jan. 23, 2003

(65) Prior Publication Data

US 2004/0175071 A1 Sep. 9, 2004

Related U.S. Application Data

(60) Provisional application No. 60/305,600, filed on Jul. 17, 2001.

(30) Foreign Application Priority Data

Jul. 13, 2001 (SE) ...................... 0102525

(51) Int. Cl.
*G02B 6/28* (2006.01)
*H04J 14/02* (2006.01)

(52) U.S. Cl. .......................... 385/24; 385/16; 385/17; 398/83; 398/79; 398/82

(58) Field of Classification Search ................. 385/24, 385/16–17; 398/71, 79, 82, 83
See application file for complete search history.

(56) References Cited

U.S. PATENT DOCUMENTS 5,864,414 A * 1/1999 Barnsley et al. ............. 398/71
6,192,173 B1 2/2001 Solheim et al.

FOREIGN PATENT DOCUMENTS

| EP | 1009121 A2 | 6/2000 |
| EP | 1065820 A2 | 1/2001 |
| WO | 9965164 A2 | 12/1999 |
| WO | 0022765 A1 | 4/2000 |
| WO | 0076105 A1 | 12/2000 |

* cited by examiner

*Primary Examiner*—Frank G. Font
*Assistant Examiner*—Michael P. Mooney
(74) *Attorney, Agent, or Firm*—Birch, Stewart, Kolasch & Birch, LLP

(57) ABSTRACT

A broadcast and select ring network for optical WDM communication includes two parallel fiber rings (1a, 1b) carrying traffic in opposite directions between nodes (3; A, B, C, D). The nodes comprise on their receive side selecting means such as a cross connect device (21) or similar means allowing a flexible selection of the wavelength channels which are to be received by each node. Thereby, any WDM channel in the rings can be selected and received in the nodes. For example, all nodes can receive signals in the same channel for e.g. set up or reconfiguration purposes. Furthermore, the number of receivers in a node can be small but still all channels can be received. The number of transmitters in each a node can also be small since every transmitter can reach every receiver.

27 Claims, 5 Drawing Sheets

Fig. 3a

*Figure showing Node A with client equipment (Tx 27, Rx 29), WDM TETs (5), WDM RETs (21), 2x1 optical switches (23), MUX (7), DEMUX, optical amplifier 22e, band add ch. 1-4, 13e, 13w, 22w, 1a, 1b, 25.*

Fig. 3b

*Figure showing Node A with client equipment (Tx 27, Rx 29), WDM TETs (5), WDM RETs, 2x1 fiber coupler (32), on/off switches (31e, 31w), MUX, DEMUX, 17w, 22w, 1a, optical amplifier 22e, band add ch. 1-4, 13e, 13w, 1b, 25.*

WDM RING NETWORK FOR FLEXIBLE CONNECTIONS

RELATED APPLICATIONS

This application claims priority and benefit from Swedish patent application No. 0102525-3, filed Jul. 13, 2001 and U.S. provisional patent application No. 60/305,600, filed Jul. 17, 2001, the entire teachings of which are incorporated herein by reference.

TECHNICAL FIELD

The present invention relates to a flexible, optical WDM ring network and to an add/drop node used in such a network.

BACKGROUND

Wavelength division multiplexing (WDM) is a method used to transport several independent optical signals on one optical fiber. WDM can be used for point-to-point communication where two nodes, one in each end of-the fiber, are connected, or for multipoint-to-multipoint communication where several nodes share the transmission capacity on one fiber or on a pair of fibers. In the case of multipoint-to-multipoint communication the fiber or fibers used usually forms a closed loop, a ring, in order to have two different routes between a pair of nodes in the case of fiber or other equipment failure. Bus networks in which the end nodes are located at different places are also possible. An example of an add-drop node in such a ring or bus WDM network is given in the published European patent application 0905936.

A schematic of an elementary WDM ring network is shown in FIG. 1. The traffic in the two ring fibers goes in opposite directions and each fiber carry traffic in one direction only. In the nodes wavelength selective optical add and drop ("add/drop") filters are provided that allow the selected wavelength channel to be added/dropped to/from a ring fiber with a low loss, and let all other wavelength channels pass along the ring fiber with a low loss. In FIG. 1 the arrows in and out of the nodes symbolize interfaces for the payload portion of the information transported in the ring network.

A general network can comprise a plurality of networks, e.g. of the kind illustrated in FIG. 1, connected to each other in various configurations. In such a general type network the traffic pattern high up in the network hierarchy, such as in core rings, is typically meshed, i.e. each node has a direct access to most other nodes in the ring via dedicated wavelength channels. Further down in the network hierarchy closer to the end user, i.e. in access rings, the traffic pattern is typically hubbed, i.e. one central or main node, the hub, has a direct connection, via dedicated wavelength channels, with every other small node, satellite node. To the satellite nodes no wavelength channels are assigned for allowing them to communicate directly with each other.

All multipoint-to-multipoint WDM networks utilize wavelength routing, which means that signals of each wavelength channel are routed from one node to another in a predetermined way. Using single wavelength lasers and fixed optical demultiplexers this routing is static from an optical point of view. Any flexibility has to be outside the WDM domain. A need can therefore exist for a WDM network in which communication paths can be changed using optical signalling.

The published European patent application No. 1065820 discloses optical ring networks for fixed connections. The nodes have specially designed broadband optical couplers connected in the fiber rings. U.S. Pat. No. 5,612,805 discloses a node connected in an optical ring network in which the signal in the ring path is divided into all possible channels, selected ones of which can be received in the node using a 1×2 switch for each channel. In the node disclosed in the published European patent application No. 1009120 receiving only in fixed channels is provided. A complicated node structure for optical networks is disclosed in U.S. Pat. No. 5,739,935. The node structure of the published International patent application No. WO 99/65164 only uses fixed channels.

SUMMARY

It is an object of the invention to provide an optical network having add/drop nodes allowing broadcast signals to be received.

It is another object of the invention to provide an optical network in which communication paths can be changed using optical signalling.

As can be derived from the discussion above, there may be a general desire to be able to change the communication paths within a WDM network in order to fast and cost-efficiently meet a demand for a different traffic pattern. For this purpose a broadcast and select network can be used. In such a network each transmitted signal can be received by the receivers in several nodes. If broadcast is desired, i.e. that a message should be simultaneously transmitted to and received by receivers in a plurality of nodes, such a desire or need occurring in special situations, several receivers are on, listening to the wavelength channel in which the broadcast message is transmitted, but usually bidirectional traffic is required between only pairs of nodes. In the bidirectional traffic case, for bidirectional traffic between two nodes in a pair, two wavelength channels are used, a transmitter in one of the nodes transmitting in a first channel and a receiver in the other node receiving in the same first channel and a transmitter in the other node transmitting in a second, different channel and a receiver in said one of the node receiving in the second channel. Generally this means that only one pair of several possible receivers is on in the pair of nodes, listening to the signals at the wavelength channels sent by a transmitter of the remote node in the node pair and that the other receivers of the pair of nodes are off for this wavelength, and that all transmitters in the node are off for transmitting on said wavelength channels except those being required for the bidirectional communication between the considered nodes of the considered pair.

The broadcast and select WDM ring network to be described herein and a node for such a network includes selecting means such as a crossconnect device or an arrangement comprising tunable single-channel filters on the receiver side allowing a flexible selection of the wavelength channels which are to be received in each node.

Thus, by using either a crossconnect unit after optically demultiplexing signals received in a node, or by power splitting and tunable band filtering in the node any WDM channel in the ring can be selected and received in the node. For example, all nodes can receive signals in the same channel for e.g. set up or reconfiguration purposes. The advantages of such a broadcast and select WDM network include the following:

the number of receivers in a node can be less than the number of channels that can be selected.

the number of transmitters in a node can be kept at a minimum since every transmitter can reach every receiver.

remote control of channel selection is possible.

broadcast is possible.

coexistence with fixed wavelength (other wavelengths) channels is possible.

fiber protection only or fiber and WDM equipment protection is possible.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 3a is a block diagram of a modified add/drop node to be used in the network of FIG. 2, FIG. 3b is a block diagram similar to that of FIG. 3a of still another modified add/drop node.

DETAILED DESCRIPTION

Figure 1:
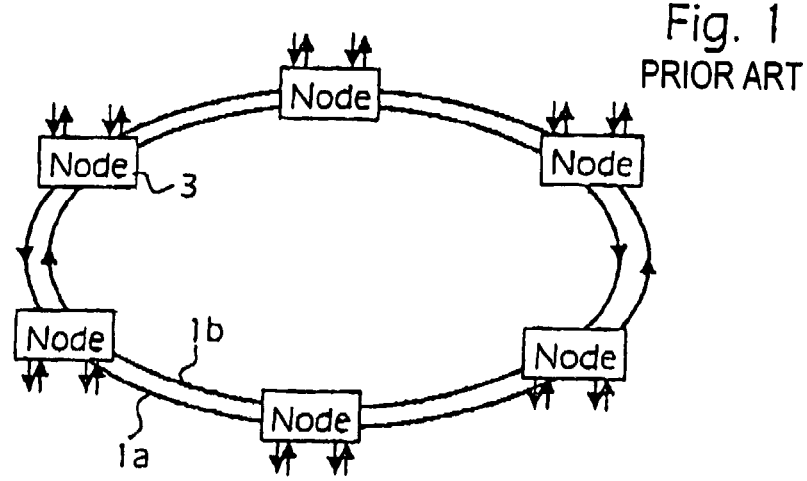
FIG. 1 is a block diagram of a general optical WDM ring network according to prior art and having protection.

The general structure of a typical WDM ring network is shown in the diagram of FIG. 1. Two parallel ring paths $1a$, $1b$ of optical fibers carry light signals propagating in opposite directions. In each fiber ring the light comprising the signals is called the traffic in the path. In each fiber ring the signals are transferred in a plurality of distinct wavelength bands or wavelength channels. In the ring paths a plurality of nodes 3 are connected, the nodes also called add/drop nodes. In each such node signals are taken or dropped from the traffic in at least one of the ring paths and signals are provided or added to the traffic in at least one of the ring paths. For the illustrated case where two parallel ring paths carry traffic in opposite directions for allowing bidirectional communication between the nodes, redundancy or protection is obtained. Thus, for transmission from a sending node to a receiving node two paths can be used, a first path being part of a first one of the fiber rings and a second path being part of the second fiber ring, the second path corresponding or being parallel to the part of the first ring which is not used for the first path. Normally only one of the first and second paths is used, the other one only used for protection and thus only used when the first path is in failure.

A WDM network can include a broadcast and select network or include a broad-cast and select feature or mode allowing fast changes of the communication paths. In a broadcast and select network each transmitted signal can be received in several nodes. In the case where broadcast is desired, several nodes are listening, instead of the normal case where bidirectional traffic exists between only pairs of nodes. In the latter case only one pair of several possible receiving nodes are listening and the receivers of the other nodes are off, and also all transmitters in the nodes for the wavelength channel used for the communication are off except those of the pair participating in the bidirectional communication.

Figure 2:
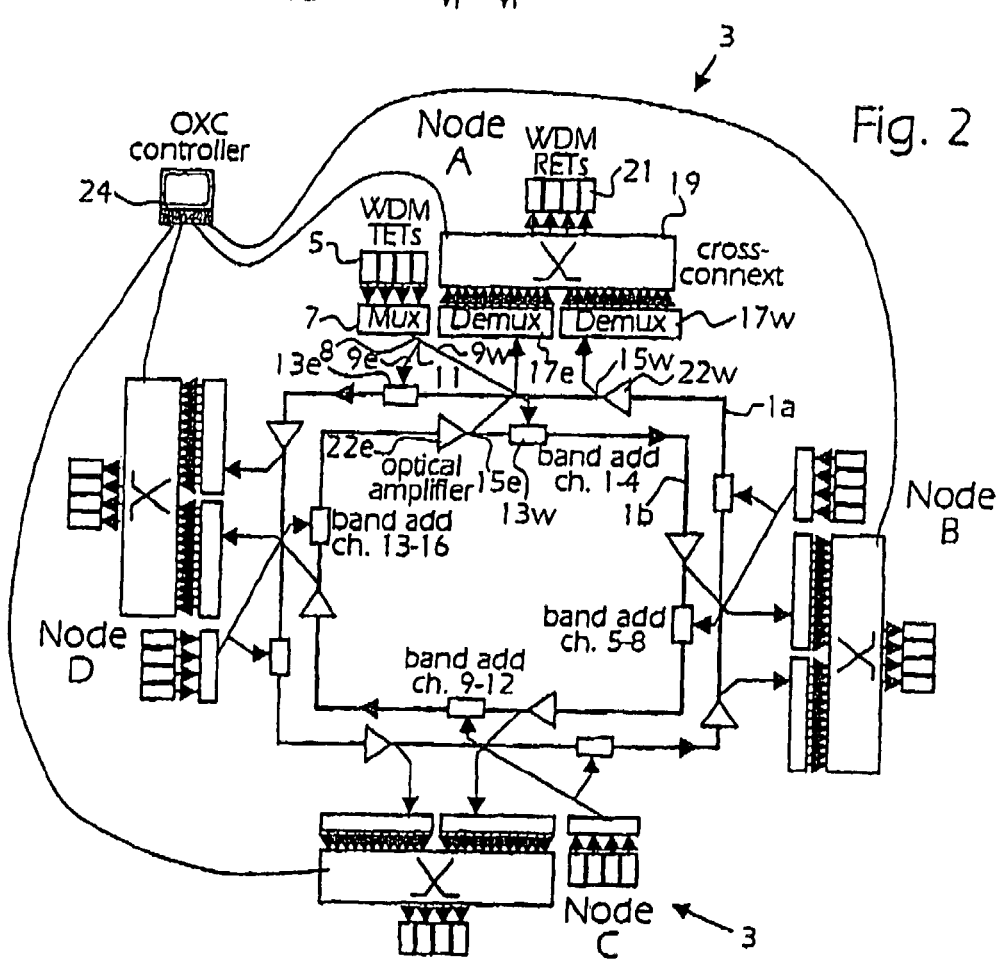
FIG. 2 is a block diagram of a flexible optical WDM ring network having protection for the ring transmission paths and for the receive sides of the add/drop nodes and allowing broadcasting.

A first embodiment of a broadcast and select WDM ring network is shown by the diagram of FIG. 2. Two ring fibers or generally ring transmission paths $1a$, $1b$ connect the nodes 3 as in FIG. 1. The outer ring $1a$ as seen in FIG. 2 is carrying traffic, i.e. the signals carrying the information considered, in the anti-clockwise direction and the inner ring fiber $1b$ is carrying traffic in the clockwise direction.

In each node 3, WDM transmit end transponders (TETs) 5 are provided, the output signals of which are optically multiplexed in a multiplexer 7 to be forwarded to a short fiber 8 before being split into two branches $9e$, $9w$ in a fiber coupler 11. The signals in the first one of the fiber coupler outputs in the branch $9e$ are added to the traffic in the outer ring fiber $1a$ by a wavelength selective band add filter $13e$, and the signals in the second fiber coupler output in the branch $9w$ are added to the traffic in inner ring fiber $1b$ by a similar band add filter $13w$. In this way the same signals are going around the two fiber rings $1a$, $1b$ in opposite directions.

The wavelength selective add filters $13e$, $13w$ are multiplexing signals of the wavelength channels issued by the TETs 5 onto the ring fibers $1a$, $1b$ with a low loss. The wavelength selective add filters $13e$, $13w$ allow all other wavelength channels pass along the respective ring fiber with a low loss, and they block signals of the same wavelengths as those of the signals of the added wavelength channels issued from the TETs from passing the add filters along the respective ring fiber. In this way circulating signals are blocked, which is absolutely necessary.

In each node 3 there are two not wavelength selective drop couplers $15w$, $15e$, e.g. standard optical fiber couplers, that are tapping off a fraction of the power of all signals in the two ring fibers $1a$, $1b$. In this first embodiment all signals from each drop coupler $15w$, $15e$ that possibly should be received in the considered node are demultiplexed into individual channels in an optical demultiplexer $17w$, $17e$. The signals from the two demultiplexers are coupled into a crossconnect unit 19 having at least 2×N inputs and M outputs, where N is the number of different wavelength channels that possibly shall be received in the node and M is the number of receive end transponders (RETs) 21 in the node. M can have any integer value but preferably M≧2, i.e. at least two receivers are preferably provided. If only bidirectional communication would be used in the network M is also the number of TETs 5 in the node.

In this way, signals from e.g. a TET 5 of the wavelength channel No. 1 in a node A to a RET 21 in a node B are multiplexed and added onto the traffic in the ring fibers 1$a$, 1$b$, travel in the respective opposite directions on the two ring fibers up to the node B. No other TET in the entire network is allowed to simultaneously transmit on the same wavelength. In the node B a fraction of the power of all signals on each ring fiber is tapped off in the respective drop coupler 15$w$, 15$e$ and is demultiplexed in the demultiplexer 17$w$, 17$e$ connected thereto. The crossconnect unit 19 is set so that it connects only one of the two identical signal streams of wavelength channel No. 1 to the appropriate RET 21.

Optical amplifiers 22$w$, 22$e$ can be placed along the ring fibers 1$a$, 1$b$ in order to overcome optical losses and thereby increase the size of the network.

The reason for having two alternative paths 1$a$, 1$b$, carrying traffic in the clockwise and anti-clockwise directions, between two considered nodes is for achieving fiber protection. Assume that the crossconnect unit 19 in a node B in a normal working condition selects the signals from the node A that propagate along the inner ring fiber 1$b$ in the figure, i.e. the shortest path. If there is a fiber break or an amplifier failure on that path then a loss of power for the expected signals or a signal degradation is detected in the RET 21 in the node B and the crossconnect unit 19 is then controlled or programmed to switch over so that it connects the signals on the same wavelength channel going on the outer fiber 1$a$ to the same RET 21 in the node B. In this way the traffic is restored.

Generally, it is possible for the crossconnect unit 19 to connect a RET 21 to listen to any of the demultiplexed signals. This means that each RET 21 can listen to any of the TETs 5, in the network by remotely controlling its crossconnect unit. All TETs 5 always transmit on different wavelengths. When changing received channel the crossconnect unit 19 should also be "pre-programmed" to be prepared to switch to the same channel on the other fiber path in the case of a failure on the ordinary path. For this node structure a full broadcast and select function can be obtained without having one RET 21 or WDM receiver for every channel that possibly shall be selected in that node, i.e. the node structure allows the case in which the condition N>M is fulfilled, i.e. that there are more wavelength channels used in the network than receivers in each node.

A central control unit 24 can be connected to the crossconnect units 19 for the control thereof. The network transmitting the control information to the crossconnect units can either be a completely separate data control network (DCN) or it can comprise an optical control channel transferring the control information through the ring fiber paths 1$a$, 1$b$.

For fiber protection reasons the crossconnect unit 19 can be supplemented with an array of N 2×1 fiber optic space switches 23, see FIG. 3$a$. In this figure also a client equipment 25 is seen that includes a transmitter 27 and a receiver 29. If the full functionality, as in FIG. 2, shall be obtained in this type of node, an N×M crossconnect switch, not shown in this figure, must be connected between the 2×1 switches 23 and the RETs 21. The 2×1 switches 23 connected to the RETs 21 can also be replaced by a set of N pairs of RETs 31$e$, 31$w$, which are controlled or coupled to each other so that one thereof is always off and the other one thereof always is on, followed by 2×1 passive couplers 32 connected in front of the respective client receivers 29, see FIG. 3$b$. Again, if a full functionality for broadcasting shall be obtained, an N×M crossconnect unit, not shown in this figure, must be connected between the output terminals of the passive couplers 32 and the M client receivers 29. Hence, without providing any crossconnect unit in the nodes illustrated in FIGS. 3$a$ and 3$b$, it is only possible to protect for a fiber/amplifier/demultiplexer failure, see FIG. 3$a$, or a fiber/amplifier/demultiplexer/RET failure, see FIG. 3$b$.

Figure 4:
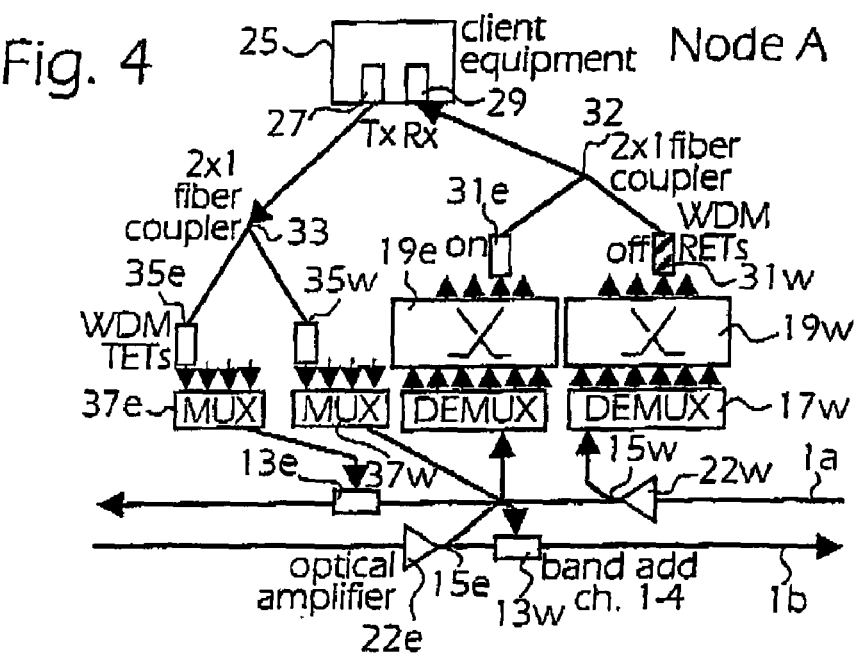
FIG. 4 is a block diagram of a modified add/drop node to be used in the network of FIG. 2 having protection also for the transmit side.

In a network having nodes like those illustrated by the diagram of FIG. 4 where also the TETs are duplicated fill fiber and equipment protection is provided. In this node structure the single multiplexer 7 and the simple coupler 11 on the output side of the node are replaced by M simple splitters 33, only one illustrated in the figure, each simple splitter connected to receive signals from the transmitter 27 of a respective client equipment 25 and feeding the split signals to two TETS 35$e$, 35$w$, which are in turn connected to the input side of two multiplexers 37$e$, 37$w$, one for each ring fiber path 1$a$, 1$b$. The output terminals of the multiplexers 37$e$, 37$w$ are connected to the add filters 13$e$, 13$w$. In the node structure illustrated in FIG. 4 also the single crossconnect unit receiving signals from the two rig fiber paths 1$a$, 1$b$ is replaced by two crossconnect units 19$e$, 19$w$, each receiving signals from only one ring fiber path through the respective drop coupler 15$e$, 15$w$. The outputs of the crossconnect units are connected to the RETs 31$e$, 31$w$ which are arranged in pairs as in the node structure illustrated in FIG. 3$b$. Here only 2M RETs are needed.

The demultiplexers 17$w$, 17$e$ used in the nodes structures illustrated in FIGS. 2–4 can be of the type where the demultiplexed channel is dropped and all other channels continue so that more demultiplexing/drop filters for new wavelength channels can be added later on.

All demultiplexer output ports do not have to be connected to a RET 21 via a crossconnect unit 19, 19$e$, 19$w$ or similarly working assembly. Some wavelength channels can be permanently connected directly to a RET 21 or to a WDM receiver, this case however not shown in the figures.

The multiplexer and band add filter arrangement in FIGS. 2–4 used to add wavelength channels to the traffic in the ring fibers 1$a$, 1$b$ can be replaced by several single channel add filters on the ring fibers where the add port is directly coupled to one WDM transmitter or TET. Thus, the multiplexers 37$e$, 37$w$ and the band add filters 13$e$, 13$w$ of the node structure of FIG. 4 can be replaced by single channel add filters 39$e$, 39$w$ connected in series with each other in the respective ring fiber path 1$a$, 1$b$, these add filters connected similarly to the add filters seen in the part diagram of a node in FIG. 5. In the node structures illustrated in FIGS. 2, 3$a$, 3$b$ also simple splitting couplers, not shown, must be connected, in order to have the same structure on the transmit side, to the output terminals of the TETs 5 to have them connected in the two ring fiber paths. In the partial view of FIG. 5 the transmit side of a node as illustrated in FIG. 4 is seen, having single channel add filters 39$e$, 39$w$ and two identical TETs 35$e$, 35$w$ arranged for each client transmitter 27, their output terminals being connected to respective single channel add filters 39$e$, 39$w$ in the ring fiber paths 1$a$, 1$b$.

Figure 6:
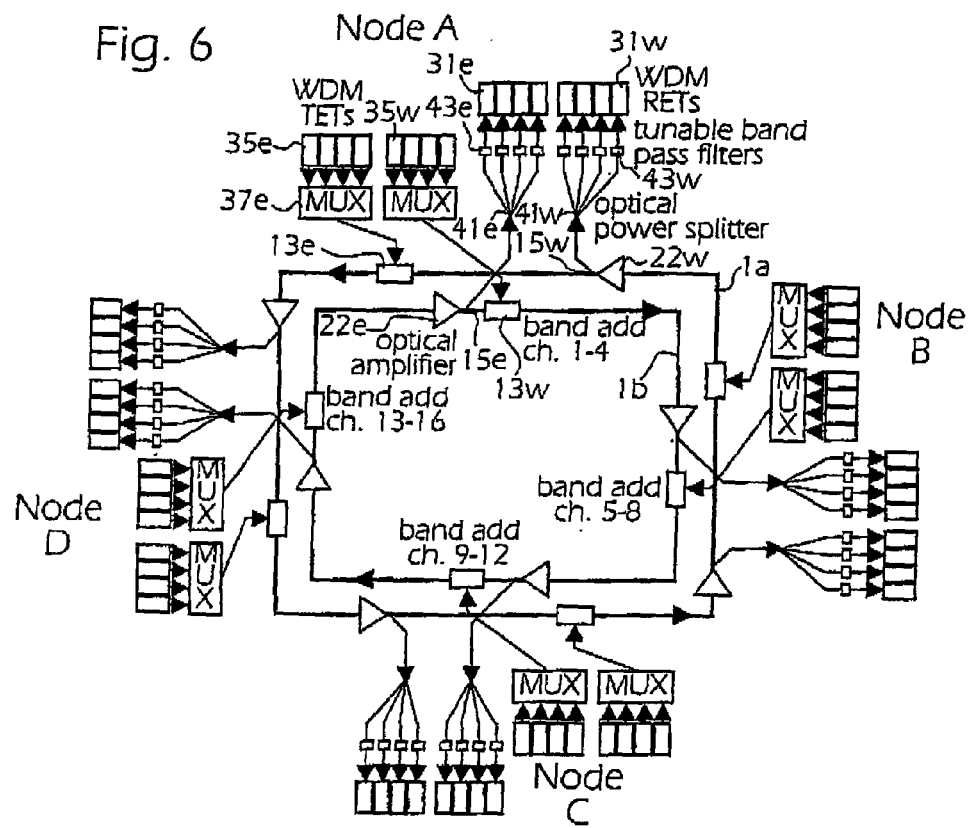
FIG. 6 is a block diagram of another embodiment of a flexible optical WDM ring network having protection for the ring transmission paths and for the transmit and receive sides of the add/drop nodes and allowing broadcasting.

In a second embodiment, see FIG. 6, the demultiplexers and crossconnect units in the nodes are replaced by power splitters and tunable band pass filters.

The transmit side of a such node can be the same as in any of the nodes illustrated in FIGS. 2–5. On the receive side the signals branched off in the tap couplers 15$w$, 15$e$ are split in optical power splitters 41$w$, 41$e$ having several, i.e. M, output terminals. These power splitters are not wavelength selective and can be made from a number of cascaded 1×2 fiber couplers or be waveguide based or have any other suitable design. The function of the splitters 41$w$, 41$e$ is that all wavelength channels are present in each output arm of the power splitter but with a reduced optical power. To each output branch of the power splitters is a wavelength tunable band pass filter 43w, 43e connected, letting only one of the wavelength channels pass with a low loss, and blocking the other ones. By appropriately tuning such a filter any one of the channels present on the ring fiber can be selected and be received by the RET 31w, 31e connected to the considered filter. The RETs are arranged in pairs as in the nodes illustrated in FIGS. 3b and 4, the RETs of each pair receiving the same wavelength channel and connected to the same client equipment and controlled to be on only one at a time.

Alternatively, only one RET per received channel is needed in which case a 2×1 space switch, not shown, is connected between the output terminals of the two bandpass filters 43w, 43e working on the same wavelength and the RET, or alternatively the 2×1 space switch can be replaced by a simple 2×1 passive fiber coupler, not shown. In the latter case, one of the two tuneable bandpass filters is tuned to block all channels.

The tunable band pass filters 43w, 43e can e.g. comprise adjustable Fabry-Perot etalons or tunable fiber gratings combined with optical circulators.

The number of output ports of the power splitters 41w, 41e and the number of tunable band pass filters 43w, 43e should be equal to, or exceed with a smallest possible quantity, the number M of RETs 31e, 31w needed in the node.

Figure 5:
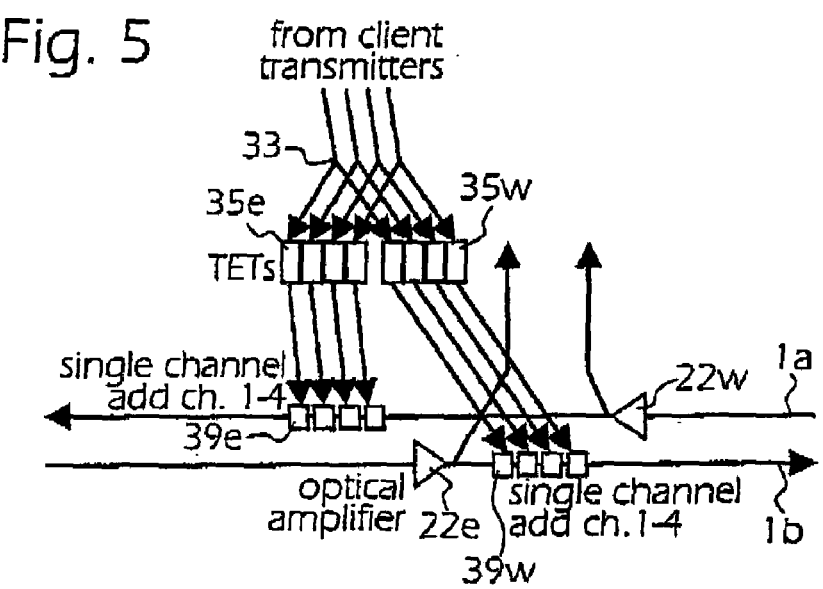
FIG. 5 is a block diagram of still another modified add/drop node having protection also for the transmit side.

If fiber and WDM equipment protection is needed in the embodiment of FIG. 6 each client equipment transmitter (27), not drawn in this figure, should be connected to two TETs 35e, 35w working on the same wavelength channel by using a 1×2 fiber coupler (33) as in the node structure illustrated in FIGS. 4 and 5. In the node structure of FIG. 6, also each client receiver 29, not seen in this figure, should be connected via a 2×1 fiber coupler, like the fiber coupler 32 of FIG. 3b, to the two RETs 31w, 31e listening to the traffic on the two different ring fibers 1a, 1b and on the same, selected wavelength channel.

Figure 7:
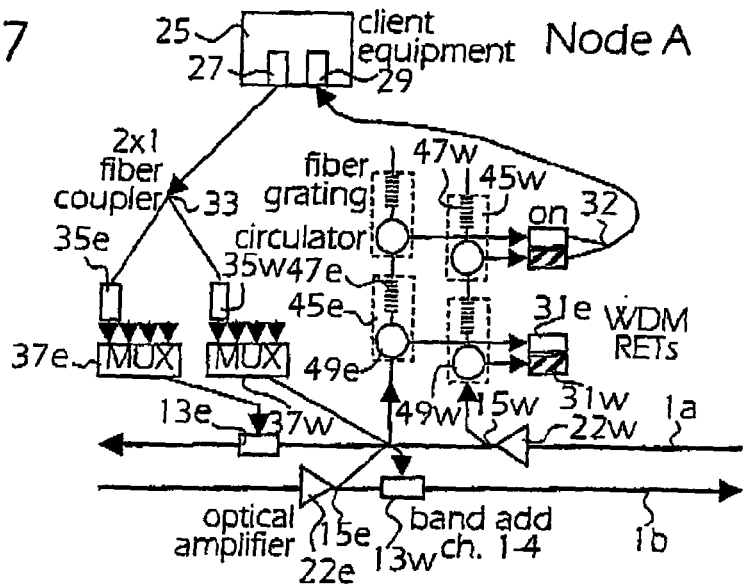
FIG. 7 is a block diagram of a modified add/drop node to be used in the network of FIG. 6.
Figure 8:
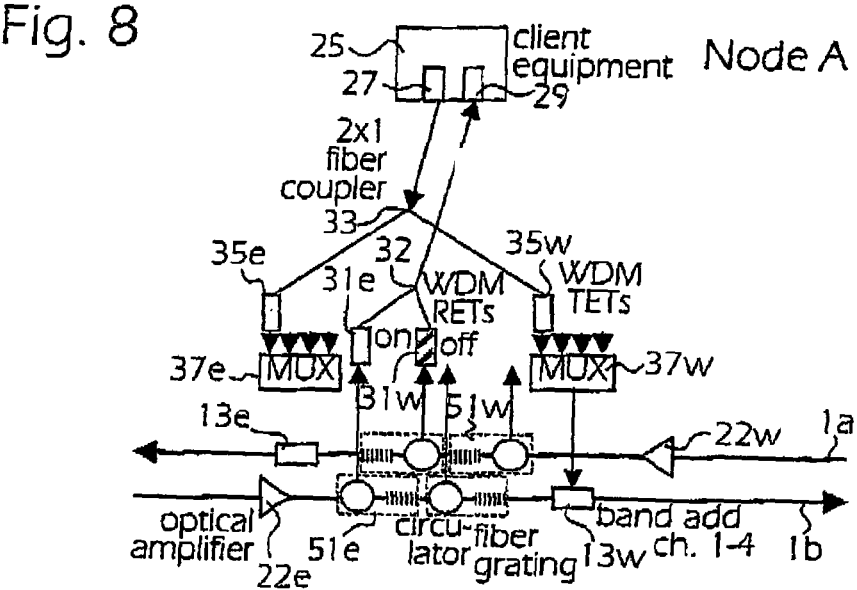
FIG. 8 is a block diagram similar to that of FIG. 7 of still another modified add/drop node.

Instead of a power splitter followed by tunable band pass filters it is also possible to arrange tunable drop filters directly after the respective ring tap coupler. Such a node structure is shown in FIG. 7. In the embodiment illustrated in this figure, the tunable drop filters 45w, 45e are connected in series in the tapping branch of the respective tap coupler 15w, 15e that is connected in the ring transmission path 1b, 1a. They can e.g. comprise a tunable fiber Bragg filter 47w, 47e combined with an optical circulator 49w, 49e. It is also possible to arrange tunable drop filters 51w, 51e connected directly in the ring fiber transmission paths 1b, 1a as shown in FIG. 8. The tunable filters are connected in series with each other and replace the tap couplers 15e, 15w in the respective ring fiber path 1a, 1b which are used in the other node structures.

Thus, two main embodiments of a broadcast and select WDM network have been described. Either a crossconnect unit is provided in the nodes acting as a selecting means receiving signals after optical demultiplexing or the selecting means include elements performing power splitting and tunable band filtering. Thereby, any WDM channel used for signalling in the ring can be selected and received in each node. For example, all nodes can receive signals in the same channel for e.g. set up or reconfiguration purposes.

In all examples above any wavelength channels that is not used for the current flexible connections can be used for other flexible connections or for standard fixed WDM connections.

All networks described above have a meshed traffic pattern. This communication scheme can obviously also be used as part of a network having hubbed connections.

In the networks described herein a WDM transmitter laser can either be an integrated WDM transmitter of the client equipment itself or a part of a transmit end WDM transponder (TET) that receives its signal input optically from the client equipment, such transmitting means being generally called transmitting units.

In the networks described herein a WDM receiver can either be an integrated receiver of the client equipment itself or a part of a receive end WDM transponder (RET) that receives the optical signal from the WDM network -and retransmits it optically to the client equipment, such receiving means being generally called receiving units.

In the networks described herein where a crossconnect unit is used, the crossconnect unit can either be an all optical device or include an electrical switch core provided with onto-electrical receivers connected at the input side and with electro-optical transmitters on the output side. These receivers can replace the RETs used in the node structures illustrated in FIGS. 2 and 4.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. An optical WDM network for flexible connections comprising:
   at least one fiber ring path for carrying light signals, and
   nodes connected in said at least one ring path and having transmit and receive sides arranged to transmit and receive respectively light signals carrying information in distinct wavelength channels,
   receiver units and transmitter units comprised in the nodes, at least one of the nodes comprising:
   at least one add filter connected in the fiber ring path for adding light signals from the transmitter units of said at least one of the nodes to the light signals in said at least one fiber ring path,
   an optical power splitter connected in said at least one fiber ring path, the optical power splitter tapping off a portion of the power of signals propagating in said at least one fiber ring path, the portion containing light signals in all wavelength channels incoming to said at least one of the nodes,
   a demultiplexer connected to receive the tapped-off portion from the optical power splitter in said at least one of the nodes and separating the signals of the wavelength channels comprised in said tapped-off portion from each other, and
   a selector connected to receive the separated signals of the wavelength channels from the demultiplexer and connected to the receiver units of said least one of the nodes for switching signals in selected ones of the wavelength channels to the receiver units so that each of the receiver units of said at least one of the nodes can be selected to receive signals of any one of all of the wavelength channels.

2. An optical WDM network according to claim 1, wherein the add filter is a band add filter.

3. An optical WDM network according to claim 2, wherein the add filter is a band add filter for adding lights signals in at least two adjacent wavelength channels.

4. An optical WDM network according to claim 1, wherein the selector is an optical crossconnect unit.

5. An optical WDM network according to claim 1, wherein two parallel fiber ring paths carry signals in opposite directions, each one of the nodes being connected to the two parallel fiber ring paths and said at least one of the nodes comprising two demultiplexers, one demultiplexer for each of the two parallel fiber ring paths, the selector of said at least one of the nodes comprising a single optical crossconnect unit connected to receive signals from the two demultiplexers.

6. An optical WDM network according to claim 1, wherein two parallel fiber ring paths, one first fiber ring path and one second fiber ring path, carry signals in opposite directions.

7. An optical WDM network according to claim 6, wherein said at least one of the nodes further comprises:
optical power splitters connected in the two parallel fiber ring paths, one of the optical power splitters connected in the first fiber ring path and a different one of the optical power splitters connected in the second fiber ring path, each of the optical power splitters tapping off a portion of the power of signals propagating in a respective one of the two parallel fiber ring paths, and
demultiplexers connected to receive said tapped-off portions from the optical power splitters, the demultiplexers separating the signals of the wavelength channels comprised in said tapped-off portions from each other and providing the separated signals to the selector.

8. An optical WDM network according to claim 7, wherein the selector comprises a single optical crossconnect unit connected to receive the separated signals from the demultiplexers.

9. An optical WDM network according to claim 7, wherein said at least one of the nodes further comprises:
optical switches connected to receive signals from the demultiplexers, a first input terminal of each of the optical switches connected to receive signals derived prom the first fiber ring path and a second input terminal of each of the optical switches connected to receive signals derived from the second fiber ring path, each of the optical switches transferring signals from one of two input terminals to a single output terminal connected to one of the receiving units of said at least one of the nodes.

10. An optical WDM network according to claim 7, wherein at least one of the receiver units of said at least one of the nodes comprises two receiver elements connected to receive signals from the demultiplexers, a first receiver element connected to receive signals derived from the first fiber ring path and a second receiver element connected to receive signals derived from the second fiber ring path, the receiver elements of said at least one of the receiver units connected to each other so that only one of the two receiver elements can be active at a time, receiving signals from a respective one of the demultiplexers.

11. An optical WDM network according to claim 1, wherein the selector of said at least one of the nodes comprises an optical power splitter and tunable band pass filters, the optical power splitter splitting incoming signal power into a number of substantially equal fractions, each fraction fed to one of the tunable band pass filters that have output terminals connected to the receiver units of said at least one of the nodes.

12. An optical WDM network according to claim 1, wherein the selector of said at least one of the nodes comprises tunable band pass filters connected in series with each other, the tunable band pass filters having output terminals connected to the receiver units of said at least one of the nodes.

13. An optical WDM network according to claim 12, wherein said at least one of the nodes further comprises an optical fiber line extending from an output terminal of the optical power splitter of said at least one of the nodes, the tunable band pass filters connected in series with each other in the optical fiber line.

14. An optical WDM network according to claim 12, wherein the tunable band pass filters are connected in said at least one fiber ring path.

15. An optical WDM network according to claim 6, wherein said at least one of the nodes further comprises two receiver units for each of client equipments in said at least one of the nodes, the two receiver units receiving signals from different ones of the two parallel fiber ring paths.

16. An optical WDM network according to claim 15, wherein said two receiver units for each of client equipments are controllable to be in on and off positions so that when one of the two receiver units is on, the other one of the two receiver units is off and vice versa.

17. An optical WDM network according to claim 1, wherein the number of the receiver units in said at least one of the nodes is smaller than the number of the wavelength channels.

18. An optical WDM network for flexible connections comprising:
at least one fiber ring path for carrying light signals, and
nodes connected in the ring path, and having transmit and receive sides arranged to transmit and receive respectively light signals carrying information in distinct wavelength channels,
receiver units comprised in the, nodes,
at least one of nodes further comprises a selector connected to the receiver units of said at least one of the nodes for switching signals in selected ones of the wavelength channels to the receiver units of said at least one of the nodes so that each of the receiver units of said at least one of the nodes can be selected to receive signals of any one of the wavelength channels, the selector comprising tunable band pass filters connected in series with each other, the tunable band pass filters having output terminals connected to the receiver units of said at least one of the nodes.

19. An optical WDM network according to claim 18, wherein parallel fiber ring paths, a first fiber ring path and a second fiber ring path, carry signals in opposite directions.

20. An optical WDM network according to claim 19, wherein said at least one of the nodes further comprises two receiver units for each of client equipments in said at least one of the nodes, the two receiver units receiving signals from different ones of the two parallel fiber ring paths.

21. An optical WDM network according to claim 20, wherein said two receiver units for each of client equipments are controllable to be in on and off positions so that when one of the two receiver units is on, the other one of the two receiver units is off and vice versa.

22. An optical WDM network according to claim 18, wherein the number of the receiver units in said at least one of the nodes is smaller than the number of the wavelength channels.

23. A node for an optical WDM network allowing flexible connections, the network comprising at least one fiber ring path for carrying light signals, the node being connectable in said at least one ring path, the node having transmit and receive sides arranged to transmit and receive respectively light signals carrying information in distinct wavelength channels, the transmit side comprising at least one transmitter unit and the receive side comprising at least one receiver unit, the node further comprising:
- at least one add filter connectable in said at least one fiber ring path for adding light signals from said at least one transmitter unit to light signals in the fiber ring path when the node is connected in an optical WDM network,
- an optical power splitter connectable in said at least one fiber ring path for tapping off a portion of power of signals propagating in the at least one fiber ring path, said tapped-off portion containing light signals in all wavelength channels incoming to the node when connected in an optical WDM network,
- a demultiplexer connected to receive the tapped-off portion from the optical power splitter and separating the signals of the wavelength channels comprised in said tapped-off portion from each other, and
- a selector connected to receive the separated signals of the wavelength channels from the demultiplexer and connected to said at least one receiver unit for switching signals in one selected among all of the wavelength channels to said at least one receiver unit.

24. A node according to claim 23, wherein the add filter is a band add filter.

25. A node according to claim 24, wherein the add filter is a band add filter for adding lights signals in at least two adjacent wavelength channels.

26. A node according to claim 23, further comprising at least two receiver units, the selector connected to all of said at least two receiver units for switching signals in selected ones of the wavelength channels to the receiver units so that each of said at least two receiver units can be selected to receive signals of any one of all of the wavelength channels.

27. A node for an optical WDM network allowing flexible connections, the network comprising at least one fiber ring path for carrying light signals, the node being connectable in said at least one ring path, the node having transmit and receive sides arranged to transmit and receive respectively light signals carrying information in distinct wavelength channels, the receive side comprising at least two receiver units, a selector connected to said at least two receiver units for switching signals in selected ones of the wavelength channels to said at least two receiver units so that each of said at least two receiver units can be selected to receive signals of any one of the wavelength channels, the selector comprising tunable band pass filters connected in series with each other, the tunable band pass filters having output terminals connected to said at least two receiver units.

* * * * *